2 Sheets--Sheet 1.

V. H. De FORVILLE.
Supports and Connections for Portable Telegraph Apparatus.

No. 151,100. Patented May 19, 1874.

WITNESSES.
T. C. Smith
Wm. E. Chaffee

INVENTOR.
V. Hairy de Forville
by Attorneys
W. Morris Smith

2 Sheets--Sheet 2.
V. H. De FORVILLE.
Supports and Connections for Portable Telegraph Apparatus.
No. 151,100. Patented May 19, 1874.
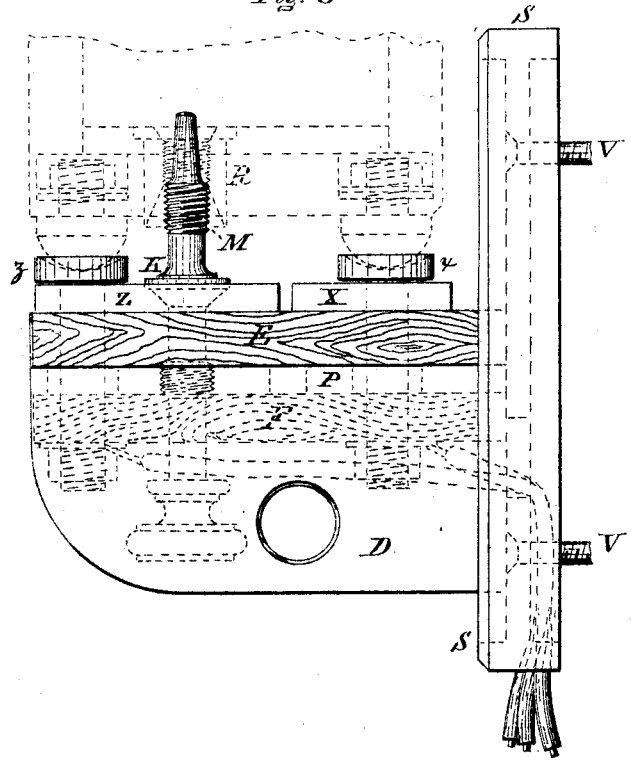
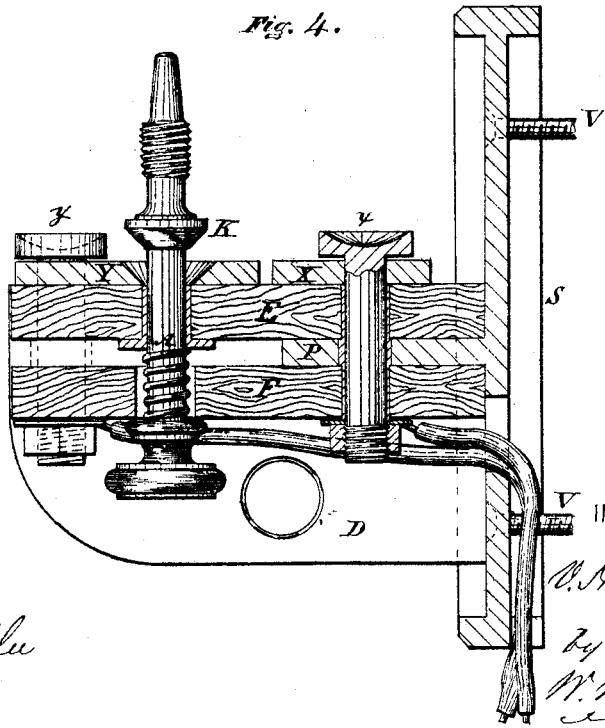
WITNESSES:
T. C. Smith.
Wm. E. Chaffee.
INVENTOR.
V. Hauy de Forville
by attorney
W. Morris Smith.

UNITED STATES PATENT OFFICE.

VALENTINE HAÜY DE FORVILLE, OF ST. PETERSBURG, RUSSIA.

IMPROVEMENT IN SUPPORTS AND CONNECTIONS FOR PORTABLE TELEGRAPH APPARATUS.

Specification forming part of Letters Patent No. 151,100, dated May 19, 1874; application filed February 24, 1874.

*To all whom it may concern:*

Be it known that I, the Marquis VALENTINE HAÜY DE FORVILLE, of St. Petersburg, in the Empire of Russia, have invented a new and useful device called a "Commutator for making hydraulic connections or diverting the circuit on Telegraph-Lines," of which the following is a specification:

This invention is designed to provide ready means for putting my portable electro-magnetic instrument in communication with other telegraph-offices, either to the right or to the left, without cutting the wire or breaking the main line, thus dispensing with the necessity of having a special wire for railroad purposes.

Figure 1:
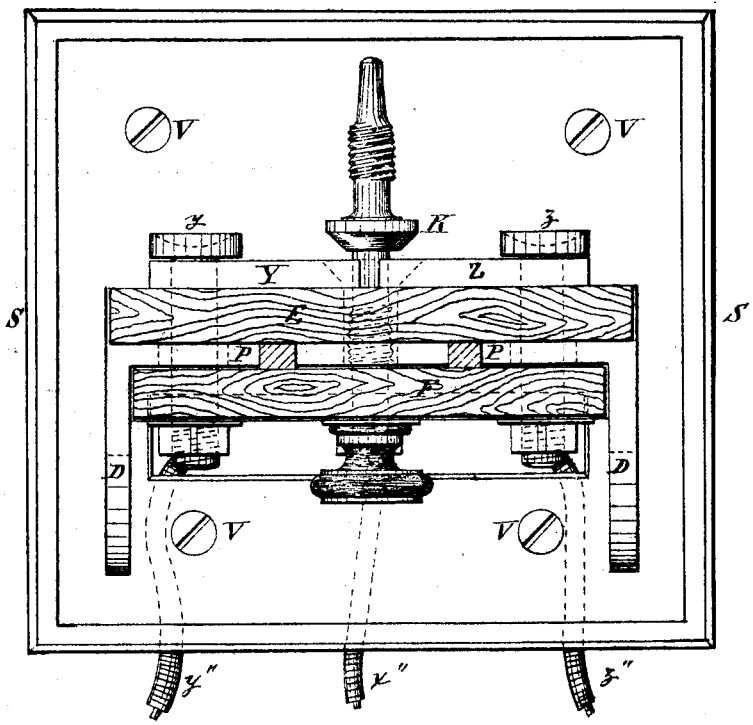
Figure 2:
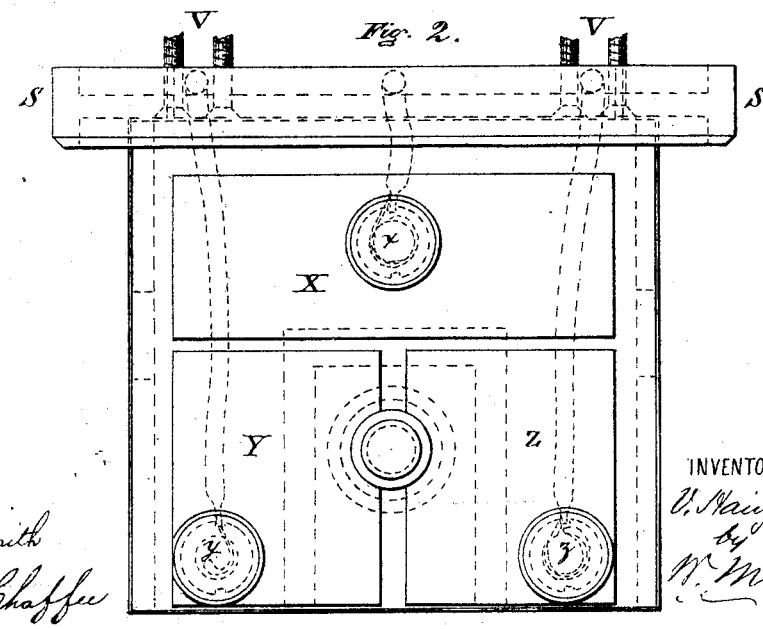

Figure 1 represents a front view of the bracket, with the connection K in position to pass the current through the portable instrument, severing the main line. Fig. 2 is a top or plan view of the same, showing the right, left, and ground connections of the instrument. Fig. 3 shows a side view of the bracket, with the portable apparatus represented as applied by dotted outline preparatory to forming the circuit through it. Fig. 4 is a similar view with the parts in position, as when the main line is severed, and the electric current connected with the portable instrument.

The same letters appearing on the several figures indicate like parts.

This invention, while particularly adapted to and intended for use in connection with my portable telegraph-instrument, may be used in connection with any other instrument for the like purpose, and is designed to be placed in the watch-box or station-house of every keeper of a railroad-line; and it consists of a metal bracket to be fastened to one of the walls of the guard-house or other building, the horizontal extension P forming foundation on which to make the connections, and to seat the portable instrument.

I will now describe the commutator by referring to the drawings, in which—

S represents the vertical portion of the bracket, which is to be attached to the wall of the station or guard house by screws V or other suitable means. The horizontal extension P and side plates or cheeks D are all formed in one piece with the casting S. This bracket S P D is insulated from the circuit and from the ground by pieces of wood E and F, coated with tar or other suitable material. On the upper surface of the insulator-board E are arranged three metallic plates, X Y Z, which, with the insulators E and F and the horizontal portion P of the bracket, are secured together by bolts $x\ y\ z$ passing through them. The three plates X Y Z are each independent of the other; but by medium of the bolt $y$ the plate Y is connected with the left-hand wire $y''$, and by the bolt $z$ the plate Z is connected with the right-hand wire $z''$. The valve-shaped plug K, then, being seated between the plates Y and Z in a conical seat, forms the connection or continuity of the main line. A ground-wire connects with the plate X through the bolt $x$; but this is inoperative, or forms no connection with the electric circuit without the portable instrument, which is the subject of another application. The upper surface of the heads $x\ y\ z$ are made concave, to receive the feet of the portable instrument, through which the connection is made, with the line to the right and left, and by screwing the connecting-plug K into the base of said portable instrument to break the connection between the plates Y Z, the circuit may be continued through the key to both sides; or, by the position of the pin in the instrument, either side may be placed in connection with the ground, and thus the circuit will be formed in one direction only, as desired, and on unscrewing and removing the portable instrument the plug K is drawn down by the spring A into contact with the plates Y and Z, to re-establish the circuit on the through line, thus saving the time and trouble of cutting and reconnecting the established line.

It will be obvious that any telegraphing-instrument may be used in connection with this device by simply making connection with any two of the plates X Y Z to establish a circuit in the desired direction, as before described, the plug K being raised if communication in one direction only is desired, in which case connection must be made with the ground-wire X to complete the circuit.

On account of the necessity of securing perfect contact between the knobs or feet of the instrument and the bolts $x\ y\ z$ of the commutator, I construct said bolts with the cupped or concave heads, in which a few drops of water may be applied in case of oxidation of said heads, through which medium a perfect current is secured.

What is here claimed, and desired to be secured by Letters Patent, is—

The combination of the plates X Y Z, the bolts $x\ y\ z$, and plug K with the telegraph-wires $y''$ and $z''$, and with a ground-wire, $x''$, for operation as set forth.

MARQUIS V. HAÜY DE FORVILLE.

Witnesses:
 PETER QUOSIG,
 CONSTANTINE DE BODISCO.